United States Patent
Ishikawa et al.

(10) Patent No.: US 6,290,245 B1
(45) Date of Patent: *Sep. 18, 2001

(54) APPARATUS FOR CONTROLLING PIVOTING OF AXLES IN INDUSTRIAL VEHICLES

(75) Inventors: Kazuo Ishikawa; Takaki Ogawa; Masakatsu Suzuki; Takashi Yamada, all of Kariya (JP)

(73) Assignee: Kabushiki Kaisha Toyoda Jidoshokki Seisakusho, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,224

(22) Filed: Sep. 28, 1998

(30) Foreign Application Priority Data

Oct. 6, 1997 (JP) .................................................. 9-272929

(51) Int. Cl.⁷ .................................................. B60G 11/56
(52) U.S. Cl. .................. 280/124.16; 280/5.5; 280/5.502; 280/5.507; 280/5.508; 280/124.101; 280/755
(58) Field of Search ................................ 280/124.16, 5.5, 280/5.501, 5.502, 5.507, 5.508, 124.1, 124.101, 124.111, 124.157, 755

(56) References Cited

U.S. PATENT DOCUMENTS 4,936,423   6/1990   Karnopp .

FOREIGN PATENT DOCUMENTS

| 392366 A1 | 1/1990 | (DE) . |
|---|---|---|
| 0 796 749A2 | 9/1997 | (EP) . |
| 2 560 325 | 8/1985 | (FR) . |
| 2 588 343 | 4/1987 | (FR) . |
| 58-183307 | 10/1983 | (JP) . |
| 58-211903 | 12/1983 | (JP) . |
| 62-214009 | 9/1987 | (JP) . |
| 58-211903 | 12/1993 | (JP) . |
| 9315125 | 12/1997 | (JP) . |

*Primary Examiner*—Eric Culbreth
(74) *Attorney, Agent, or Firm*—Morgan & Finnegan, L.L.P.

(57) ABSTRACT

An apparatus for controlling pivoting of a forklift rear axle. A hydraulic damper is arranged between a rear axle and a forklift body. The damper includes two oil chambers. The oil chambers are connected to a first passage and a second passage. A two-way switch valve is arranged between the oil chambers. The valve permits the flow of oil between the oil chambers and allows pivoting of the rear axle when opened. The valve restricts the flow of oil between the oil chambers and prohibits pivoting of the rear axle, thereby locking the rear axle when closed. When the rear axle is released from a locked state, the valve repeats a valve cycle, which includes opening and closing the valve, to regulate the amount of fluid that flows between the chambers. The valve is then kept in an opened state. This prevents shock that may be produced by sudden tilting of the body when the rear axle is released from a locked state.

18 Claims, 6 Drawing Sheets

APPARATUS FOR CONTROLLING PIVOTING OF AXLES IN INDUSTRIAL VEHICLES

BACKGROUND OF THE INVENTION

The present invention relates to apparatuses for controlling pivoting of axles in industrial vehicles. More particularly, the present invention relates to an apparatus for controlling a pivotally supported axle and locking the pivoting of the axle with respect to a vehicle body when necessary.

An industrial vehicle such as a forklift typically has a rear axle that is supported pivotally with respect to its body. The axle pivots as the vehicle travels along bumpy roads to maintain traction between the vehicle wheels and the road surface. The pivotal axle also improves the riding comfort and the driving stability of the vehicle. However, the pivotal axle may reduce the driving stability of the vehicle when centrifugal force acting on the vehicle tilts the body as the vehicle changes directions.

Japanese Unexamined Patent Publication No. 58-211903 solves this problem by proposing a forklift that locks its axle to restrict pivoting of the axle with respect to the vehicle body when centrifugal force acting on the forklift exceeds a predetermined value. Accordingly, tilting of the vehicle body is restricted when a large centrifugal force acts on the forklift. Thus, the forklift changes directions in a stable state.

When an object carried by the forklift is lifted to a high position, the center of gravity of the forklift rises and destabilizes the forklift. Therefore, the axle may also be locked in such case when an object is lifted above a predetermined height. This would also stabilize the vehicle when lifting loads or when changing directions.

The axle is locked by a mechanism that includes a hydraulic damper, which is arranged between the body and the axle. The damper has two oil chambers connected to each other by a passage. Hydraulic oil flows between the oil chambers through the passage. The damper is locked when the movement of hydraulic oil between the oil chambers is restricted by closing the passage. When the flow of oil is prevented, the damper locks the axle and prohibits pivoting of the axle with respect to the body. When the passage is opened, movement of hydraulic oil between the oil chambers is allowed. This unlocks the damper and permits pivoting of the axle with respect to the body.

When the damper is unlocked, the hydraulic pressure in the oil chambers decreases immediately and sudden pivoting of the axle is permitted. Thus, a shock is often produced when the axle is unlocked. The shock is especially large if the axle is unlocked when the axle is pivoted at a large angle relative to the body when the vehicle is located on a level surface.

Japanese Unexamined Patent Publication No. 58-183307 describes an axle locking mechanism that prevents sudden pivoting of the axle when unlocking the axle. The mechanism has an absorber nipple, which includes a check valve and a fixed throttle valve. However, since two valves (the check valve and the throttle valve) are necessary, the structure of the axle locking mechanism is complicated. Furthermore, it is difficult to install the locking mechanism in the passage.

The arrangement of an electromagnetic proportional valve in the passage, which connects the two oil chambers of the damper, has also been proposed. When the proportional valve closes the passage, the damper is locked and pivoting of the axle is thus restricted. When the proportional valve is opened, the damper is unlocked and pivoting of the axle is permitted. The proportional valve adjusts the area opened in the passage to prevent sudden pivoting of the axle. However, the proportional valve is costly, adding significantly to the cost of the forklift.

SUMMARY OF THE INVENTION

Accordingly, it is an objective of the present invention to provide an apparatus for controlling pivoting of industrial vehicle axles that prevents sudden pivoting of the axle when the axle is released from a locked state while minimizing costs.

To achieve the above objective, the present invention provides an apparatus for controlling pivoting of an industrial vehicle axle. The axle is pivotally supported with respect to a body of an industrial vehicle. A fluid pressure damper is arranged between the axle and the body to connect the axle to the body. Pivoting of the axle is permitted when the flow of fluid through the damper is allowed, and pivoting of the axle is restricted to lock the axle when the flow of fluid through the damper is prohibited. A fluid passage is connected to the damper. A valve selectively opens and closes the fluid passage to selectively allow or prohibit the flow of fluid through the damper. The valve repeats a valve cycle, which includes opening the valve to open the fluid passage and closing the valve to close the fluid passage, to regulate the amount of fluid that flows through the fluid passage and thus limit the pivoting speed of the axle to a first predetermined value or lower when the axle is released from a locked state.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
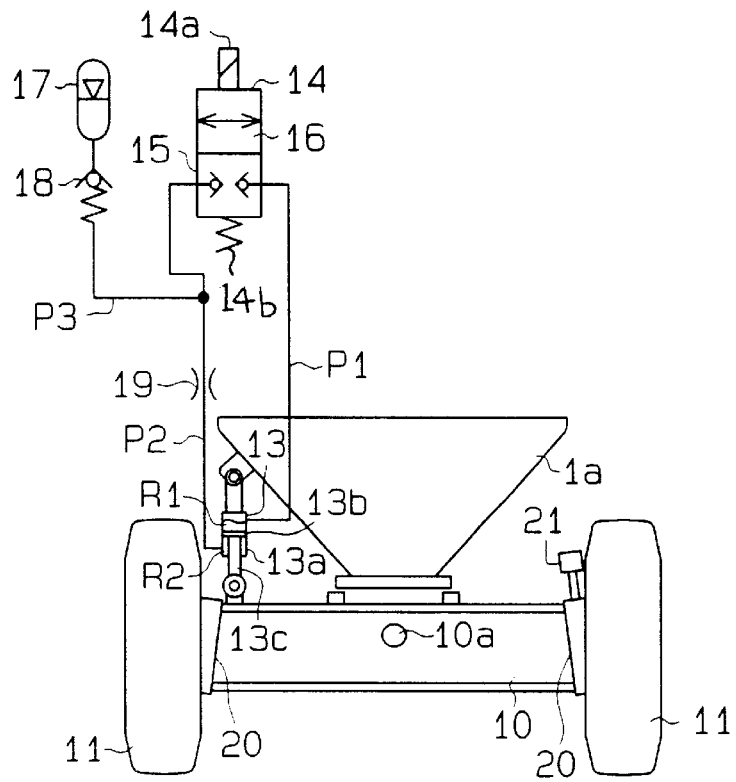
FIG. 1 is a diagrammatic view showing an axle locking mechanism employed in a first embodiment according to the present invention.

A first embodiment according to the present invention will now be described with reference to FIGS. 1 to 7. The present invention is applied to a front drive, rear steer type forklift having four wheels. As shown in FIG. 2, the forklift 1 has a body 1a. Left and right outer masts 2 are arranged at the front section of the body 1a. A pair of inner masts 3 are arranged between the outer masts 2. The inner masts 3 are lifted and lowered. A carrier, or fork 4, is supported on each inner mast 3 and lifted or lowered by a lift bracket and a chain (not shown).

Each outer mast 2 is connected to the body 1a by a tilt cylinder 5. Each cylinder 5 has a piston rod 5a. The retraction and projection of the piston rod 5a inclines the associated outer mast 2. A lift cylinder 6 is arranged behind the outer masts 2. The lift cylinder 6 has a piston rod 6a that is connected to the upper end of each inner mast 3. The projection and retraction of the piston rod 6a lowers or lifts the forks 4. Front left and right wheels 7 are connected to and driven by an engine 9 by a differential ring gear 8 (FIG. 3) and a transmission (not shown).

Figure 2:
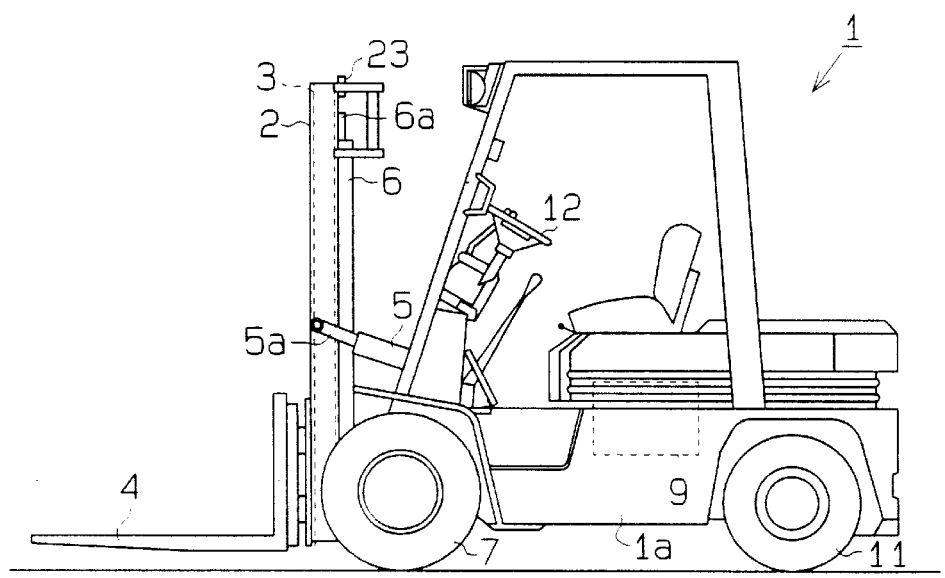
FIG. 2 is a side view showing a forklift employing the locking mechanism of FIG. 1.
Figure 3:
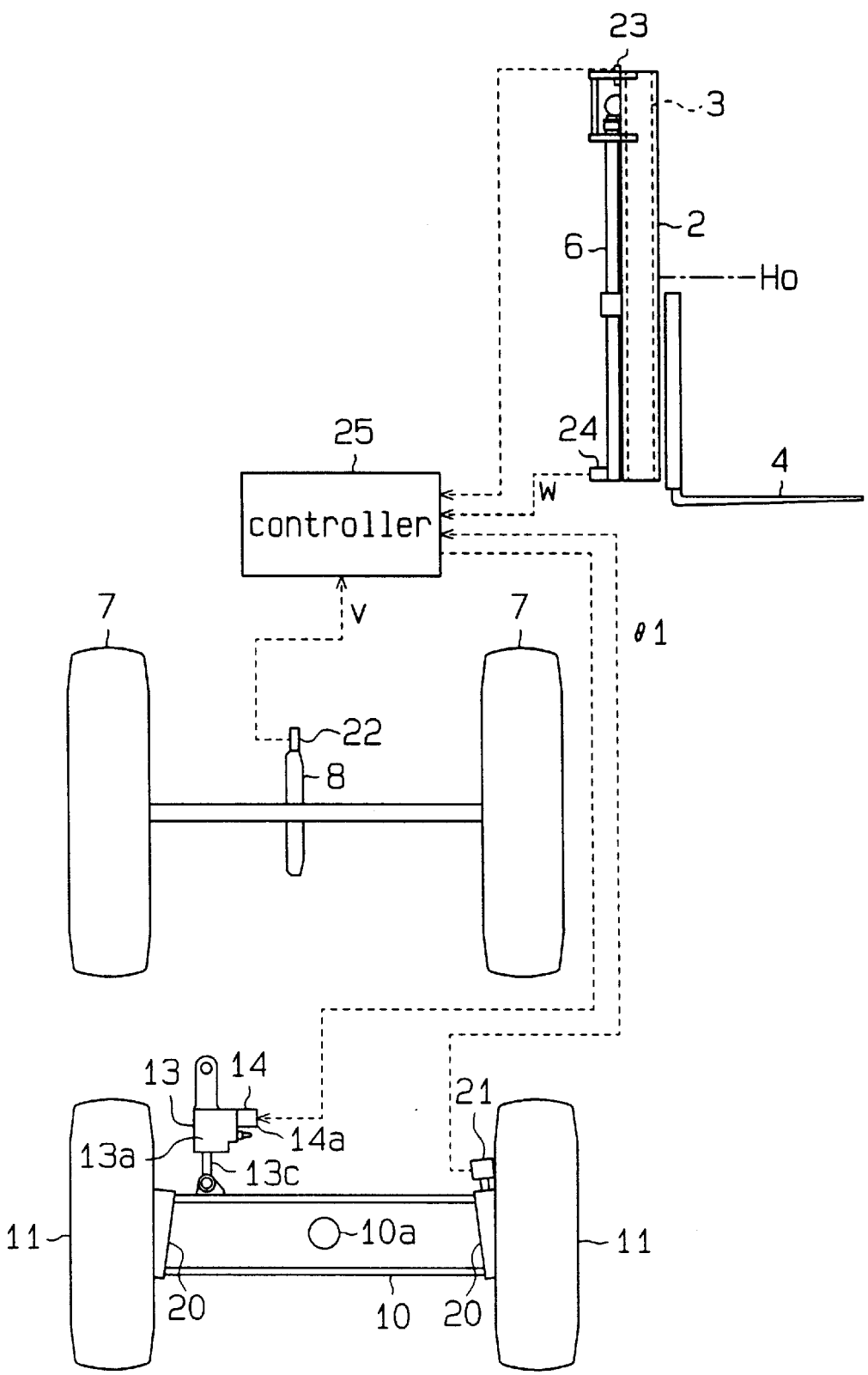
FIG. 3 is a diagrammatic view showing the pivot control apparatus for controlling the locking mechanism of FIG. 1.

As shown in FIGS. 1 and 3, a rear axle 10 extends laterally through the lower portion of the body 1a. The rear axle 10 is pivotally coupled to the body 1a by a center pin 10a. The rear axle 10 pivots about the center pin 10a in a plane parallel to the surface of the sheet of FIGS. 1 and 3.

Left and right rear wheels 11 are mounted on the ends of the rear axle 10. Each rear wheel 11 is supported by a king pin 20 and pivoted integrally with the king pin 20 to be steered. A steering cylinder (not shown) having left and right piston rods is arranged in the rear axle 10. Each piston rod is coupled to the associated rear wheel 11 by a link mechanism (not shown). A steering wheel 12 (FIG. 2), which is located in a driver's cab, is turned to actuate the steering cylinder and steer the rear wheels 11.

As shown in FIG. 1, the body 1a and the rear axle 10 are connected to each other by a hydraulic damper 13. The damper 13 is a multi-movement type hydraulic cylinder and includes a cylinder tube 13a, a piston 13b, and a piston rod 13c. The cylinder tube 13a is secured to the body 1a and houses the piston 13b. The piston rod 13c extends from the piston 13b and is coupled to the rear axle 10.

The piston 13b defines a first oil chamber R1 and a second oil chamber R2 in the cylinder tube 13a. The first oil chamber R1 is connected to a first passage P1 and the second oil chamber R2 is connected to a second passage P2. The passages P1, P2 are further connected to an electromagnetic valve 14. The electromagnetic valve 14 is a two-port, two-way switch valve having a movable spool, a solenoid 14a for driving the spool, and a spring 14b. The spool includes a connecting portion 16 for connecting the passages P1 and P2 with each other and a disconnecting portion 15 for disconnecting the passages P1 and P2 from each other. The electromagnetic valve 14 is normally closed. Thus, when the solenoid 14a is not excited, the force of the spring 14b causes the spool to disconnect the passages P1, P2 from each other with its disconnecting portion 15. An accumulator 17, which contains hydraulic oil, is connected to the second passage P2 by a third passage P3. A check valve 18 is arranged in the third passage P3.

In the state shown in FIG. 1, the solenoid 14a is not excited. Thus, the spool disconnects the passages P1, P2 from each other with its disconnecting portion 15. This prohibits the movement of hydraulic oil between the oil chambers R1, R2. As a result, movement of the piston 13b is restricted and the rear axle 10 is thus locked so that it cannot be pivoted. When the solenoid 14a is excited, the spool connects the passages P1, P2 with each other with its connecting portion 16. This permits the movement of hydraulic oil between the oil chambers R1, R2. As a result, movement of the piston 13b is permitted and the rear axle 10 is unlocked. Pivoting of the rear axle 10 is permitted in this state.

The damper 13 and the electromagnetic valve 14 form a mechanism for locking the rear axle 10, that is, for prohibiting the pivoting of the rear axle 10. A throttle valve 19 is arranged in the second passage P2.

As shown in FIGS. 1 and 3, a wheel angle sensor 21 is attached to the top of one of the king pins 20. The wheel angle sensor 21 detects the wheel angle $\theta1$ of the associated rear wheel 11 based on the rotated angle of the king pin 20. A potentiometer may be employed as the wheel angle sensor 21. As shown in FIG. 3, a vehicle speed sensor 22 is located in the vicinity of the differential ring gear 8. The vehicle speed sensor 22 detects the vehicle speed V of the forklift 1 from the rotation of the gear 8.

As shown in FIGS. 2 and 3, a height sensor 23 is attached to the top of one of the outer masts 2. A limit switch may be employed as the height sensor 23. The height sensor 23 is turned on when the forks 4 are lifted above position $H_0$ and turned off when lowered below position $H_0$. Position $H_0$ may be, for example, halfway to maximum lifting height of the forks 4. A pressure sensor 24 is accommodated in the lift cylinder 6 to detect the hydraulic pressure in the cylinder 6. The pressure detected by the pressure sensor 24 is used to obtain the weight of the load carried on the forks 4. A controller 25 is electrically connected to the solenoid 14a and the sensors 21–24.

The electronic structure of the forklift 1 will now be described with reference to FIG. 4. The controller 15 includes a microcomputer 26, analog-to-digital (A/D) converters 27, 28, 29, and a driver 30. The microcomputer 26 has a central processing unit (CPU) 31, a read only memory (ROM) 32, a random access memory (RAM) 33, a counter 34, an input interface 35, and an output interface 36.

The wheel angle sensor 21, the vehicle speed sensor 22, and the pressure sensor 24 are connected to the A/D converters 27, 28, 29, which are further connected to the input interface 35. The height sensor 23 is directly connected to the input interface 35. The input interface 35 is connected to the CPU 31. The CPU 31 is also connected to the solenoid 14a of the electromagnetic valve 14 by way of the driver 30 and the output interface 36. The CPU 31 selectively excites and de-excites the solenoid 30 with the driver 30.

Various types of program data, such as that related with axle pivoting control, is stored in the ROM 32. The pivoting control is executed to maintain the stability of the forklift 1 by permitting or prohibiting pivoting of the rear axle 10. The CPU 31 locks the rear axle 10 to prohibit pivoting when any one of the six conditions described below are satisfied.

(1) The yaw acceleration rate $\Delta\omega/\Delta T$ becomes greater than a maximum value K1.

(2) The yaw acceleration rate $\Delta\omega/\Delta T$ falls from a state satisfying condition (1) to the maximum value K1 or lower but remains greater than a minimum value K2, which is lower than the maximum value K1.

(3) The yaw acceleration rate $\Delta\omega/\Delta T$ falls from a state satisfying condition (2) to the minimum value K2 and until a predetermined time T elapses thereafter.

(4) The absolute value of a lateral acceleration Gs becomes greater than a maximum value H1.

(5) The absolute value of the lateral acceleration Gs falls from a state satisfying condition (4) to the maximum value H1 or lower but remains greater than a minimum value H2.
(6) The height sensor 23 is activated and the pressure detected by the pressure sensor 24 becomes equal to or greater than a reference value N.

The maximum and minimum acceleration rate values K1, K2 are stored in the ROM 32 and used to judge whether the axle locking condition is satisfied in correspondence with the yaw acceleration rate $\Delta\omega/\Delta T$. The maximum and minimum lateral acceleration values H1, H2 are also stored in the ROM 32 and used to judge whether the axle locking condition is satisfied in correspondence with the lateral acceleration Gs. The lateral acceleration Gs refers to the centrifugal acceleration acting laterally on the forklift 1 when the forklift 1 is steered to change directions. The reference value N is stored in the ROM 32 and used to judge whether the axle locking condition is satisfied in correspondence with the load applied on the forks 4. The values K1, K2, H1, H2 and the predetermined time T are obtained through experiments or theoretical calculations and used to judge whether or not to lock the rear axle 10 to guarantee stability when the forklift 1 is moving. The reference value N is also obtained from experiments or theoretical calculations and used to judge whether or not to lock the rear axle 10 to guarantee stability when the forklift is carrying an object.

The CPU 31 obtains the wheel angle θ1 based on the detection signal sent from the wheel angle sensor 21 and the vehicle speed V from the vehicle speed sensor 22. The CPU 31 obtains an inverse value 1/R of the forklift turning radius based on the wheel angle θ1 by referring to a map (not shown), which is stored in the ROM 32. The CPU 31 also calculates the lateral acceleration Gs from the vehicle speed V and the turning radius inverse value 1/R by using equation (1).

$$Gs = V^2/R \quad (1)$$

The CPU 31 further calculates the yaw acceleration rate $\Delta\omega/\Delta T$ from equation (2).

$$\Delta\omega/\Delta T = V \cdot \{\Delta(1/R)/\Delta T\} \quad (2)$$

The yaw rate $\omega$ is represented by the equation of $\omega = V/R$. Equation (2) is an approximate expression of the following equation, which is obtained by time differentiating the equation $\omega = V/R$.

$$\Delta\omega/\Delta T = V \cdot \{\Delta(1/R)/\Delta T\} + \{\Delta V/\Delta T\} \cdot (1/R)$$

Equation (2) is obtained since the vehicle speed V is generally constant during time $\Delta T$ when the forklift 1 is being turned, thus enabling the latter term of this equation to be ignored.

In equation (2), $\Delta(1/R)$ represents the varied amount (deviation) per predetermined time $\Delta T$ (e.g., 10 to 90 milliseconds) of the turning radius inverse value 1/R. The wheel angle θ1 is obtained every predetermined time interval $\Delta T$. The data of a number of preceding wheel angles θ1 are stored in the RAM 33. The CPU 31 reads the immediately previous wheel angle θ1 from the RAM 33. The absolute value of the difference between the inverse value 1/R of the turning radius obtained from this previous wheel angle θ1 and that of the present wheel angle θ1 is represented by $\Delta(1/R)$. The turning radius inverse value 1/R takes a negative value when the wheel 11 is steered to the left and a positive value when the rear wheel 11 is steered to the right.

The CPU 31 obtains the weight of the object held on the forks 4 based on the detection signals sent from the oressure sensor 24. The CPU 31 then judges whether or not the conditions related to the load applied to the forks 4 and the height of the forks 4 are satisfied based on the signals sent from the pressure sensor 24 and the height sensor 23.

When any one of locking conditions (1) to (6) are satisfied, the CPU 31 de-excites the solenoid 14a with the driver 30 and closes the electromagnetic valve 14 to lock the rear axle 10. If all of the locking conditions are unsatisfied, the CPU 31 excites the solenoid 14a with the driver 30 to open the electromagnetic valve 14 and release the rear axle 10 from the locked state. This permits pivoting of the rear axle 10.

When unlocking the rear axle 10, the CPU 31 controls the electromagnetic valve 14 to limit and maintain the pivoting speed of the rear axle 10 to a speed lower than a certain value. The axle pivoting speed is restricted by repetitively actuating and de-actuating the valve 14 to regulate the amount of hydraulic oil that moves between the chambers R1, R2. More specifically, the solenoid 14a of the electromagnetic valve 14 is excited and de-excited in a cyclic manner. In this embodiment, a single valve cycle lasts for about 10 to 90 milliseconds. The amount of hydraulic oil passing through the electromagnetic valve 14 is substantially determined by the ratio of the exciting time (actuated time) of the solenoid 14a during each cycle to the time during which the solenoid 14a is de-excited. In other words, the amount of passing hydraulic oil is determined by the ratio of the opened time of the electromagnetic valve 14 to the closed time during each cycle.

The electromagnetic valve 14 employed in this embodiment responds within 10 to 20 milliseconds whereas a duty valve would respond within one to two milliseconds. Thus, the electromagnetic valve 14 cannot be opened or closed as fast as a duty valve. Accordingly, a single cycle of the electromagnetic valve 14 lasts for about 20 to 90 milliseconds. The time during which the solenoid 14a is excited (actuated time) in each cycle determines the amount of hydraulic oil that passes through the electromagnetic valve 14. This determines the pivoting speed of the rear axle 10. The adjustment of the actuated time of the electromagnetic valve 14 during each cycle controls the amount of hydraulic oil passing through the electromagnetic valve 14 in a manner similar to when controlling the oil flow by adjusting the opened area of a valve.

If the actuated time of the electromagnetic valve 14 during each cycle is too long, the pivoting speed of the rear axle 10 may not be sufficiently restricted. In such case, the body 1a would tilt in a sudden manner when the rear axle 10 is unlocked. On the other hand, if the actuated time of the electromagnetic valve 14 during each cycle is too short, pressure pulsations produced in the oil chambers R1, R2 may increase and produce vibrations that are felt by the driver. Accordingly, the ratio of the actuated and de-actuated time of the electromagnetic valve 14 during each cycle must be set appropriately.

Figure 5:
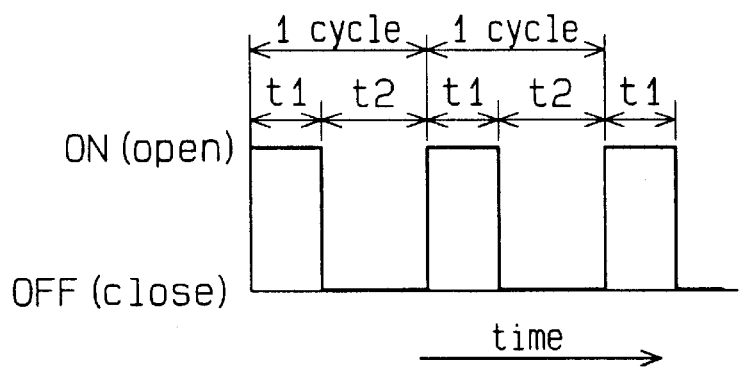
FIG. 5 is a timing chart showing the valve behavior of the control apparatus of FIG. 3.

In this embodiment, the actuation time t1 is set at 20 milliseconds while the de-actuation time t2 is set at 50 milliseconds, as shown in FIG. 5. A predetermined number of cycles (e.g., 10 cycles) is executed in accordance with the set actuation/de-actuation time. Afterward, the electromagnetic valve 14 is kept in an actuated state until one of the locking conditions are satisfied. The number of cycles executed is predetermined from experiments or theoretical calculations by considering how long it takes for the rear axle 10 to return to a level state from a greatly pivoted state.

The operation of the pivoting control apparatus will now be described. The CPU 31 executes the pivot control program in a cyclic manner based on the signals sent from the sensors 21, 22, 23, 24. If none of the locking conditions are satisfied, the CPU 31 energizes the electromagnetic valve 14 and permits pivoting of the rear axle 10. If any one of the conditions become satisfied from this state, the CPU 31 de-energizes the electromagnetic valve 14 and locks the rear axle 10.

Presuming that locking condition (1) has been satisfied (a state in which the yaw acceleration rate $\Delta\omega/\Delta T$ has become greater than the maximum value K1), if the yaw acceleration rate $\Delta\omega/\Delta T$ decreases to the maximum value K1 or lower but remains greater than the minimum value K2, the CPU 31 determines that locking condition (2) has been satisfied. In this case, the CPU 31 keeps the rear axle locked. Subsequently, if the yaw acceleration rate $\Delta\omega/\Delta T$ becomes lower than the minimum value K2, the CPU 31 starts to measure the elapsed time with the counter 34. The CPU 31 determines that locking condition (3) is being satisfied until the predetermined time T is reached. When the measured time reaches the predetermined time T, the CPU 31 determines that all locking conditions are no longer satisfied. In this case, the CPU 31 releases the rear axle 10 from the locked state.

If the locking or unlocking of the rear axle 10 were to be determined solely by judging whether or not the yaw acceleration rate $\Delta\omega/\Delta T$ is greater than the maximum value K1, the rear axle 10 would be frequently switched between a locked state and an unlocked state when, for example, the yaw acceleration rate $\Delta\omega/\Delta T$ remains close to the maximum value K1. If the forklift is traveling, this may cause the forklift to become unstable. However, this embodiment provides three locking conditions (1) to (3) that are related to the yaw acceleration rate $\Delta\omega/\Delta T$. Thus, the rear axle 10 is prevented from frequently switching between a locked state and an unlocked state. This improves the stability of the moving forklift.

Presuming that locking condition (4) has been satisfied (a state in which the absolute value of a lateral acceleration Gs becomes greater than the maximum value H1), if the absolute value of the lateral acceleration Gs falls to the maximum value H1 or lower but remains greater than the minimum value H2, the CPU 31 determines that locking condition (5) has been satisfied. In this case, the CPU 31 keeps the rear axle locked. If the locking or unlocking of the rear axle 10 were to be determined solely by judging whether or not the lateral acceleration Gs is greater than the maximum value H1, the rear axle 10 would be frequently switched between a locked state and an unlocked state when, for example, the lateral acceleration Gs remains close to the maximum value H1. If the forklift is traveling, this may cause the forklift to become unstable. However, this embodiment provides the two locking conditions of (4) and (5) that are related to the lateral acceleration Gs. Thus, the rear axle 10 is prevented from frequently switching between a locked state and an unlocked state. This improves the stability of the moving forklift.

The CPU 31 carries out the locking release control if none of the locking conditions is satisfied when the rear axle 10 is locked. More specifically, as shown in FIG. 5, the CPU 31 actuates and de-actuates the electromagnetic valve 14 repetitively for ten cycles. In each cycle, the actuation time t1 is 20 milliseconds and the de-actuation time t2 is 50 milliseconds. This controls the amount of hydraulic oil that passes through the electromagnetic valve 14 and maintains the pivoting speed of the rear axle 10 within a predetermined range.

Figure 6:
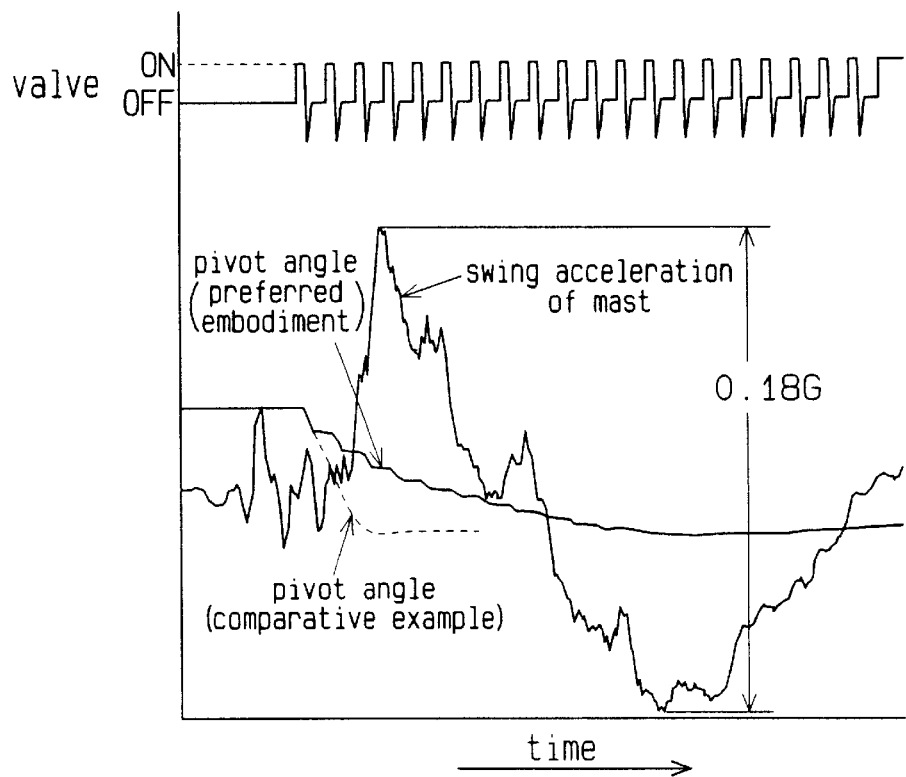
FIG. 6 is a graph showing changes in the axle pivoting angle and the mast acceleration.

FIG. 6 is a graph showing changes in the pivoting angle $\theta 2$ of the rear axle 10 and the swing acceleration of the masts with respect to time when the CPU 31 executes the repetitive actuation/de-actuation control of the electromagnetic valve 14 from a state in which the valve 14 is de-actuated. The graph was plotted based on experimental results during which ten or more actuation/de-actuation cycles were carried out repetitively. The pivot angle $\theta 2$ is the angle formed between the rear axle 10 and a horizontal plane. As shown by the solid line, the repetition of the actuation and de-actuation of the electromagnetic valve 14 gradually decreases the pivot angle $\theta 2$ of the rear axle 10. The maximum difference in the acceleration when the masts swings laterally was 0.18G. In comparison, the pivot angle $\theta 2$ decreased suddenly in a continuous and generally linear manner when maintaining the electromagnetic valve 14 in an actuated state from the beginning. In this case, the maximum difference in the acceleration when the masts swings laterally was 0.3G. It is thus apparent that changes in the pivot angle $\theta 2$ with respect to time are extremely small when ten cycles of the actuation and de-actuation of the electromagnetic valve 14 are carried out. Accordingly, the electromagnetic valve 14 may be sustained in an actuated state without any problems as long as ten cycles of the actuation and de-actuation have been carried out.

Figure 7:
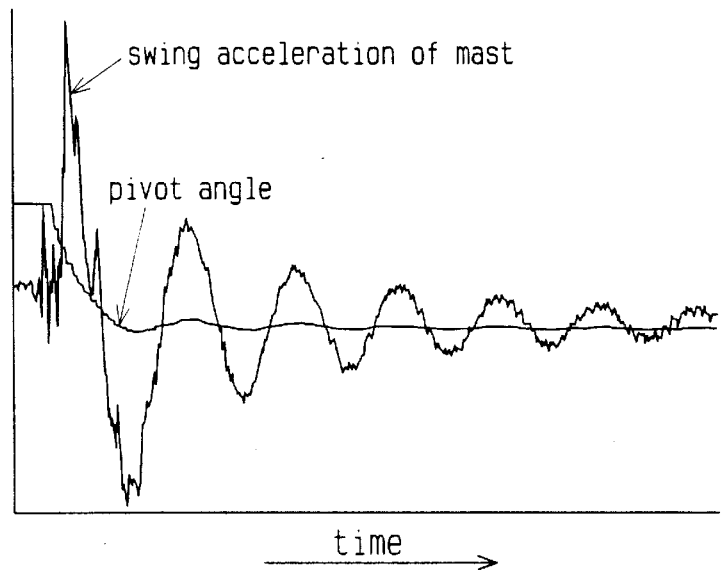
FIG. 7 is a graph showing changes in the axle pivoting angle and the mast acceleration.

FIG. 7 is a graph showing changes in the acceleration when the masts swing laterally and changes in the pivot axle $\theta 2$ of the rear axle 10 with respect to time. The horizontal axis representing time is compressed in comparison to FIG. 6.

The advantages of the first embodiment will now be described. When the rear axle 10 is unlocked, the amount of hydraulic oil that moves between the oil chambers R1, R2 of the damper 13 is restricted to keep the pivoting speed of the rear axle 10 lower than a predetermined value. This prevents shocks that may be caused by sudden tilting of the body 1$a$ when the rear axle 10 is released.

The amount of hydraulic oil moving between the oil chambers R1, R2 is restricted by selectively actuating and de-actuating the electromagnetic valve 14. This decreases costs in comparison to employing an electromagnetic proportional valve or a duty valve.

The electromagnetic valve 14 is maintained in an actuated state after repetitively actuating and de-actuating the electromagnetic valve 14 for a predetermined number of cycles regardless of the locking condition and the state of the rear axle 10 when released.

The actuation time of 20 milliseconds and the de-actuation time of 50 milliseconds during each cycle is appropriate when considering the responsiveness of the electromagnetic valve 14. Thus, the electromagnetic valve 14 is operated in a satisfactory manner.

The actuation and de-actuation time of each cycle and the number of repeated cycles to be carried out is determined from experiments or theoretical calculations so that the rear axle 10 is moved in a satisfactory manner. Thus, complicated control is eliminated. For example, the electromagnetic valve 10 need not be controlled in accordance with the pivoting angle or pivoting speed of the rear axle 10 as detected by sensors. In addition, such sensors for the rear axle 10 are not necessary. This simplifies the structure of the pivot control apparatus and reduces production costs.

Figure 9:
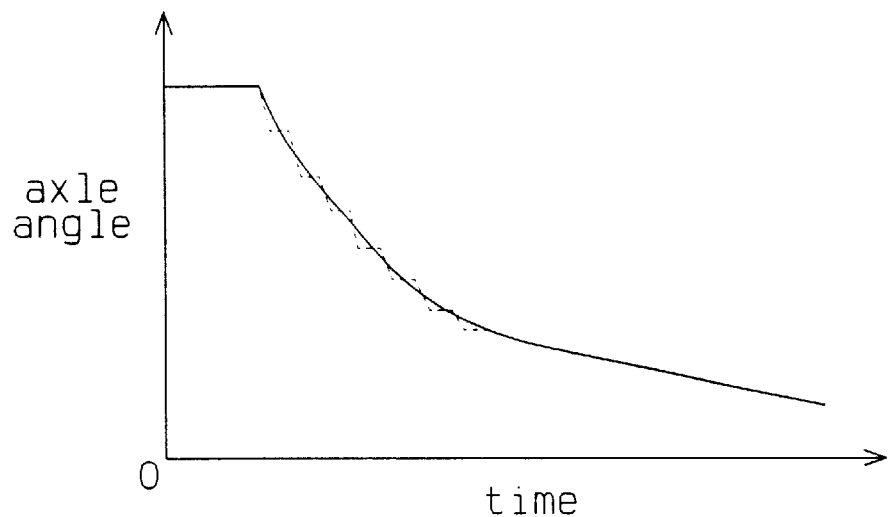
FIG. 9 is a graph showing changes in the axle pivoting angle that is input into a CPU.
Figure 10:
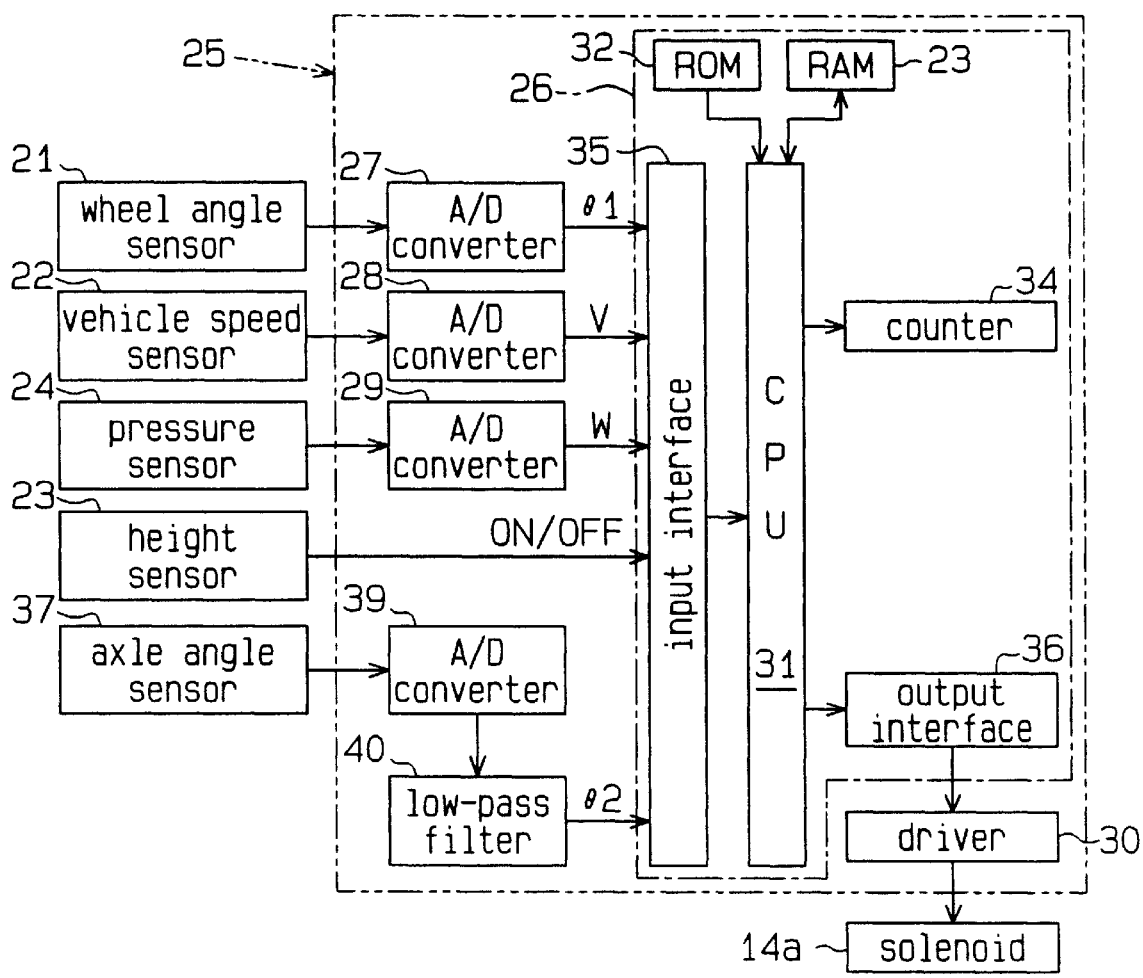
FIG. 10 is a block diagram showing the electric structure of a pivot control apparatus for controlling the locking mechanism of FIG. 8.

A second embodiment according to the present invention will now be described with reference to FIGS. 8 to 10. To avoid a redundant description, like or same reference numerals are given to those components that are like or the same as the corresponding components of the first embodiment.

In this embodiment, when the rear axle 10 is released, the electromagnetic valve 14 is actuated and de-actuated until the pivoting speed of the rear axle 10 falls to a predetermined value. The electromagnetic valve 14 is maintained in an actuated state afterward. The predetermined speed value is lower than the maximum value of the axle pivoting speed when the electromagnetic valve 14 is actuated and de-actuated cyclically. In other words, if the pivoting speed of the rear axle 10 becomes lower than the predetermined value, the CPU 31 determines that the electromagnetic valve 14 may be continuously energized.

Figure 8:
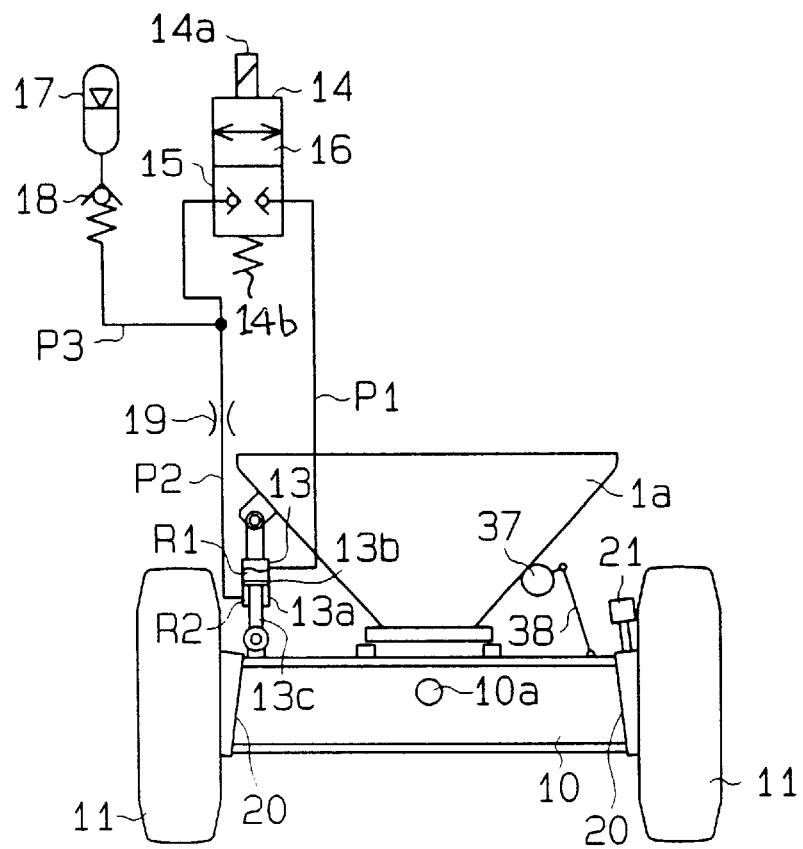
FIG. 8 is a diagrammatic view showing an axle locking mechanism employed in a second embodiment according to the present invention.

As shown in FIG. 8, a pivot angle sensor 37 may be attached to the body 1a. A rotary type potentiometer may be employed as the pivot angle sensor. Pivoting of the rear axle 10 is transmitted to the pivot angle sensor 37 by way of a link. As shown in FIG. 10, the pivot angle sensor 37 sends a signal, which represents the pivot angle θ2 of the rear axle 10, to the input interface 35 through an A/D converter 39 and a low-pass filter 40.

In this embodiment, when releasing the rear axle 10, the CPU 31 obtains the pivot angle θ2 periodically. The pivoting speed of the rear axle 10 based on changes in the pivot angle θ2. The CPU 31 actuates and de-actuates the electromagnetic valve 14 cyclically until the pivoting speed of the rear axle 10 becomes lower than a predetermined value. Afterward, the CPU 31 maintains the electromagnetic valve 14 in an actuated state. The actuated time and de-actuated time of the electromagnetic valve 14 in each cycle are determined in the same manner as in the first embodiment.

The number of repeated actuation/de-actuation cycles is not predetermined. Thus, the actuation and de-actuation of the electromagnetic valve 14 is continued until the pivoting speed of the rear axle 10 becomes lower than the predetermined value. The pivoting speed of the rear axle 10 may become lower than the predetermined value before performing ten cycles of the valve actuation/de-actuation depending on the state of the rear axle 10. Therefore, in comparison with the embodiment illustrated in FIGS. 1 to 7, in which ten cycles are performed, unnecessary cycles need not be performed in this embodiment. This prolongs the life of the electromagnetic valve 14.

When actuating and de-actuating the electromagnetic valve 14, the electromagnetic valve 14 is actually locked when de-actuated. Although the locked time is extremely short, the pivot angle θ2 of the rear axle 10 does not change during this period. Therefore, if the signal from the pivot angle sensor 37 is sent to the CPU 31 directly from the A/D converter 39, the signal received by the CPU 31 would be stepped as shown by the dotted line in FIG. 9. If the pivot angle θ2 of the rear axle 10 does not change when the electromagnetic valve 14 is de-actuated, the CPU 31 may erroneously determine that the pivoting speed has become lower than the predetermined value during de-actuation of the electromagnetic valve 14.

However, in this embodiment, the signal sent from the pivot angle sensor 37 passes through the A/D converter 39 and the low-pass filter 40 before being input into the CPU 31. This, the signal received by the CPU 31 is smooth and gradually declining as shown by the solid line in FIG. 9. Accordingly, the CPU 31 accurately acknowledges changes in the pivot angle θ2, or the pivoting speed. The electromagnetic valve 14 is thus switched to a continuously actuated state from the alternately actuated and de-actuated state at an optimal timing.

It should be apparent to those skilled in the art that the present invention may be embodied in many other specific forms without departing from the spirit or scope of the invention. More particularly, the present invention may be embodied in the modes described below.

In the first embodiment, the number of actuation/de-actuation cycles performed on the electromagnetic valve 14 may be changed arbitrarily. In the first and second embodiments, the actuated time and de-actuated time during each cycle may be changed when necessary as long as the actuated time is shorter than the de-actuated time. For example, the actuated time may be set at 20 milliseconds and the de-actuated time may be set at 40 milliseconds. Furthermore, when carrying out a number of valve cycles, more than one type of cycle may be carried out. For example, the actuated time or the de-actuated time may be changed after carrying out a certain number of valve cycles.

The alternate actuation and de-actuation of the electromagnetic valve 14 should be carried out when the rear axle 10 is locked due to the height of the forks 4 or the load applied by the object carried on the forks 4. However, the execution of the valve cycles may be eliminated under other conditions. In this case, the electromagnetic valve 14 is opened as soon as the rear axle 10 is released from the locked state. This would decrease the number of repetitive actuation/de-actuation cycles of the electromagnetic valve 14 and thus prolong the life of the electromagnetic valve 14.

In the embodiment illustrated in FIGS. 1 to 7, the electromagnetic valve 14 is actuated and de-actuated for a predetermined number of cycles when the rear axle 10 is released from the locked state. However, the electromagnetic valve 14 may be actuated and de-actuated over a predetermined time period instead of for a predetermined number of cycles. The advantages of the first embodiment are also obtained in this structure.

The normal close type electromagnetic valve 14 employed in the preferred and illustrated embodiments may be replaced by a normal open type electromagnetic valve.

The actuated time and de-actuated time during each cycle and the number of cycles may be altered in accordance with the height of the forks 4 or the load applied to the forks 4. That is, the electromagnetic valve 14 can be controlled in a further optimized manner.

In the embodiments illustrated in FIGS. 1 to 7 and FIGS. 8 to 10, the lateral acceleration Gs is calculated based on the turning radius inverse value 1/R, which is obtained from the wheel angle θ1, with reference to a map, and the vehicle speed V ($Gs=V^2/R$). However, a yaw rate sensor may be employed to replace the wheel angle sensor 21. When the yaw rate sensor is used, the lateral acceleration Gs is determined from the detected yaw rate ω and the vehicle speed V ($Gs=\omega \cdot V$). In this case, the wheel angle sensor 21 becomes unnecessary. In addition, the map for obtaining the turning radius inverse value 1/R from the wheel angle θ1 becomes unnecessary. Thus, calculation of the lateral acceleration Gs is simplified and the value of the calculated acceleration is more accurate. Furthermore, since the yaw rate ω is detected directly by the yaw rate sensor, the yaw acceleration rate $\Delta\omega/\Delta T$ is also simplified.

An acceleration sensor may be installed on the forklift 1 to directly detect the lateral acceleration that acts on the forklift 1. This would facilitate determination of the lateral acceleration in comparison to calculation of the lateral acceleration from the wheel angle θ1 and the vehicle speed V. This would also eliminate the need for the wheel angle sensor 21 and the vehicle speed sensor 22. Thus, the lateral acceleration can be obtained from a single sensor.

The locking conditions of the rear axle 10 are not limited to the six listed conditions. Furthermore, any of the locking conditions may be eliminated if not necessary. This would simplify the control of the rear axle 10.

The reference values, or criteria, related to the height of the forks or the load applied to the forks 4 may be changed for judging whether or not the locking conditions of the rear axle 10 have been satisfied. In other words, the reference values may be changed in accordance with the present height and load applied to the forks 4. This would allow for further optimization of the locking conditions and reduce the number of unnecessary locking operations.

If the present invention is applied to a forklift that can lift its forks 4 to a position higher than four meters, the rear axle 10 may be locked when the height of the forks 4 exceeds four meters regardless of whether or not a load is carried on the forks 4.

The present invention may be applied to a battery type forklift, which is driven by a motor. The present invention may also be applied to other types of industrial vehicles such as a shovel loader or a truck crane. Furthermore, the forklift may employ carrying attachments (carriers) other than forks. For example, the forklift may have clamps used to carry machine glazed paper or blocks. The forklift may also use rams used to carry cylindrical objects such as coiled wires or cables.

Therefore, the present examples and embodiments are to be considered as illustrative and not restrictive, and the invention is not to be limited to the details given herein, but may be modified within the scope and equivalence of the appended claims.

What is claimed is:

1. An apparatus for controlling pivoting of an industrial vehicle axle, the axle being pivotally supported with respect to a body of an industrial vehicle, wherein the apparatus comprises:
   a fluid pressure damper arranged between the axle and the body to connect the axle to the body, wherein pivoting of the axle is permitted when the flow of fluid through the damper is allowed, and pivoting of the axle is restricted to lock the axle when the flow of fluid through the damper is prohibited;
   a fluid passage connected to the damper; and
   a valve for selectively opening and closing the fluid passage to selectively allow or prohibit the flow of fluid through the damper, wherein the valve repeats a valve cycle, each valve cycle comprising opening the valve to open the fluid passage and closing the valve to close the fluid passage, to regulate the amount of fluid that flows through the fluid passage and thus limit the pivoting speed of the axle to a first predetermined value or lower when the axle is released from a locked state.

2. The apparatus of claim 1 further comprising a controller for controlling the valve based on the state of the vehicle, wherein the controller closes the valve to lock the axle when determining that the vehicle state satisfies a predetermined locking condition and opens the valve to unlock the axle when determining that the vehicle state does not satisfy the predetermined locking condition.

3. The apparatus of claim 2, wherein the controller keeps the valve open after repeating the valve cycle a predetermined number of times, starting from when the axle is released from a locked state.

4. The apparatus of claim 2, wherein the controller keeps the valve open after repeating the valve cycle a plurality of times over a predetermined time period in from when the axle is released from a locked state.

5. The apparatus of claim 2, wherein the controller keeps the valve open after the pivoting speed of the axle is decreased to a second predetermined value lower than the first predetermined value, by repeating the valve cycle a plurality of times, starting from when the axle is released from a locked state.

6. The apparatus of claim 2, wherein the industrial vehicle includes a movable carrier for carrying an object, the controller determining whether or not the predetermined locking condition is satisfied based on the position of the carrier or the load applied to the carrier.

7. The apparatus of claim 1, wherein the valve includes an electromagnetic two way switch valve.

8. The apparatus of claim 7, wherein the electromagnetic valve opens the fluid passage when energized and closes the fluid passage when de-energized.

9. The apparatus of claim 7, wherein each valve cycle of the electromagnetic valve lasts for about twenty to ninety milliseconds.

10. The apparatus of claim 9, wherein the electromagnetic valve has an opened time and a closed time during each cycle, the opened time and the closed time being determined in accordance with the responsiveness of the valve, the opened time being shorter than the closed time.

11. An apparatus for controlling pivoting of an industrial vehicle axle, the axle being pivotally supported with respect to a body of an industrial vehicle, wherein the apparatus comprises:
    a fluid pressure damper arranged between the axle and the body to connect the axle to the body, the damper having a piston and a pair of fluid chambers partitioned by the piston;
    a fluid passage connecting the fluid chambers, wherein movement of the piston is permitted when the flow of the fluid between the fluid chambers is permitted, movement of the piston is restricted when the flow of the fluid between the fluid chambers is regulated, pivoting of the axle is permitted when movement of the piston is permitted, and pivoting of the axle is restricted to lock the axle when movement of the piston is restricted;
    an electromagnetic two way switch valve arranged in the fluid passage to selectively permit and regulate the flow of fluid between the fluid chambers by selectively opening and closing the fluid passage; and
    a controller for controlling the electromagnetic valve based on the state of the vehicle, wherein the controller closes the valve to lock the axle when determining that the vehicle state satisfies a predetermined locking condition and opens the valve to unlock the axle when determining that the vehicle state does not satisfy the predetermined locking condition, and wherein the controller repeats a valve cycle, each cycle comprising opening the valve to open the fluid passage and closing the valve to close the fluid passage, to regulate the amount of fluid that flows through the fluid passage and thus limit the pivoting speed of the axle to a first predetermined value or lower when the axle is released from a locked state.

12. The apparatus of claim 11, wherein the controller keeps the valve open after repeating the valve cycle a predetermined number of times, starting from when the axle is released from a locked state.

13. The apparatus of claim 11, wherein the controller keeps the valve open after repeating the valve cycle a plurality of times over a predetermined time period, starting from when the axle is released from a locked state.

14. The apparatus of claim 11, wherein the controller keeps the valve open after the pivoting speed of the axle is decreased to a second predetermined value lower than the first predetermined value, by repeating the valve cycle a plurality of times, starting from when the axle is released from a locked state.

15. The apparatus of claim 11, wherein the industrial vehicle includes a forklift having a fork which is lifted and lowered to carry an object, and the controller determines whether or not the predetermined locking condition is satisfied based on the position of the fork or the load applied to the fork.

16. The apparatus of claim 11, wherein the electromagnetic valve opens the fluid passage when energized and closes the fluid passage when de-energized.

17. The apparatus of claim 11, wherein each valve cycle of the electromagnetic valve lasts for about twenty to ninety milliseconds.

18. The apparatus of claim 17, wherein the electromagnetic valve has an opened time and a closed time during each cycle, the opened time and the closed time being determined in accordance with the responsiveness of the valve, the opened time being shorter than the closed time.

* * * * *

UNITED STATES PATENT AND TRADEMARK OFFICE
CERTIFICATE OF CORRECTION

PATENT NO.    : 6,290,245 B1
DATED         : September 18, 2001
INVENTOR(S)   : Kazuo Ishikawa et al.

It is certified that error appears in the above-identified patent and that said Letters Patent is hereby corrected as shown below:

Title page,
Item [56], References Cited

FOREIGN PATENT DOCUMENTS
Please add --
58-167218  10/1983 (JP)
4-191115    7/1992 (JP) --

Drawings,
Delete Fig. 2 and insert:

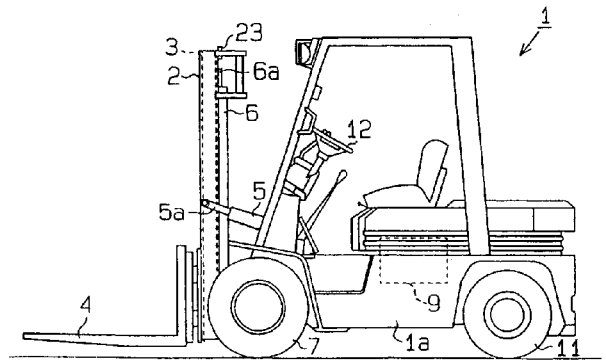

UNITED STATES PATENT AND TRADEMARK OFFICE
CERTIFICATE OF CORRECTION

PATENT NO.    : 6,290,245 B1
DATED         : September 18, 2001
INVENTOR(S)   : Kazuo Ishikawa et al.

Figure 4:
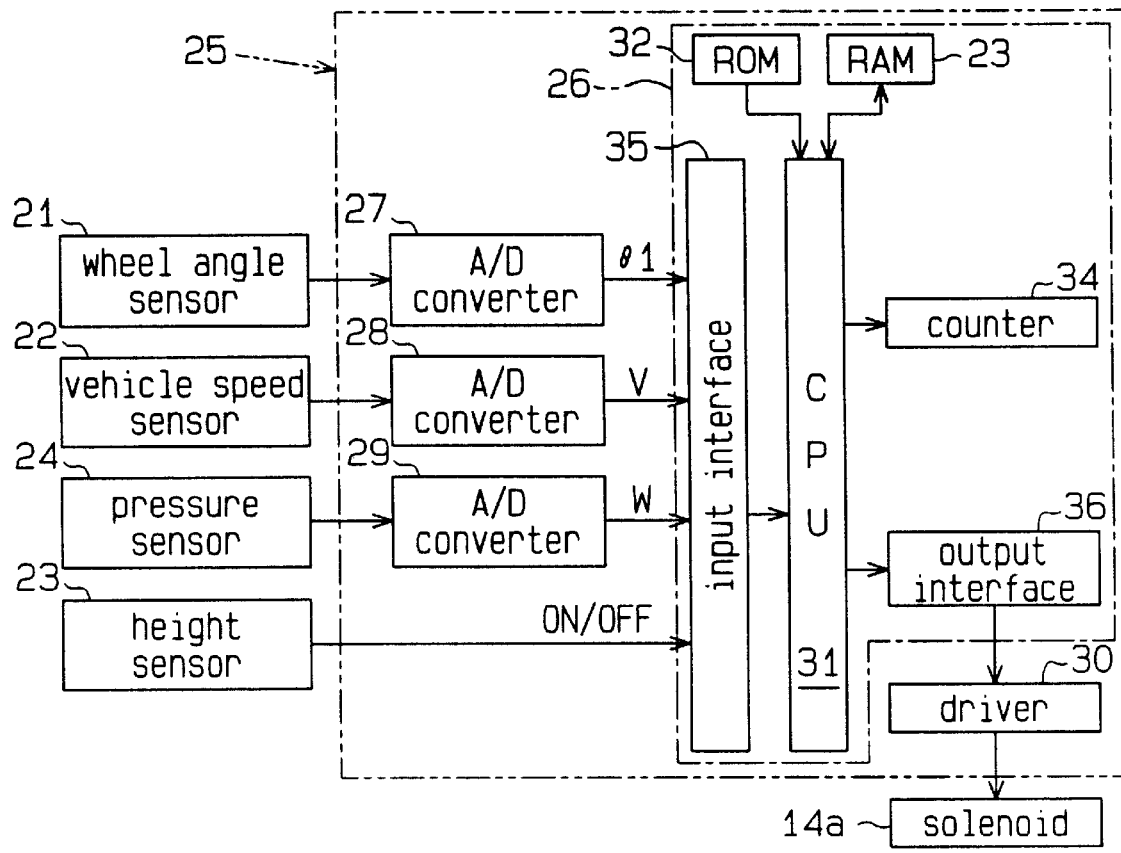
FIG. 4 is a block diagram showing the electric structure of the control apparatus of FIG. 3.

It is certified that error appears in the above-identified patent and that said Letters Patent is hereby corrected as shown below:

Drawings con't,
Delete Fig. 4 and insert:

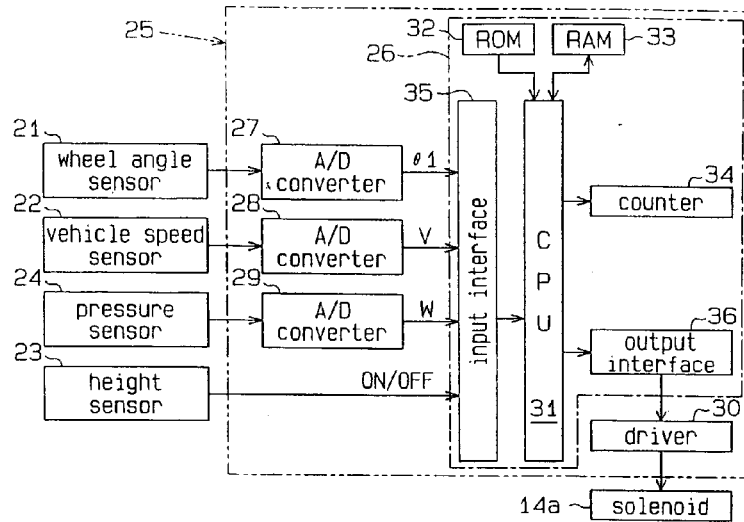

Fig.4

Column 11,
Line 62, please change "period in" to -- period, starting --.

Signed and Sealed this

Third Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,290,245 B1
DATED         : September 18, 2001
INVENTOR(S)   : Kazuo Ishikawa et al.

It is certified that error appears in the above-identified patent and that said Letters Patent is hereby corrected as shown below:

<u>Title page,</u>
Item [75], Inventors, please delete "Takashi Yamada" and insert therefor -- Tadashi Yamada --.

Signed and Sealed this

Twenty-fourth Day of December, 2002

JAMES E. ROGAN
*Director of the United States Patent and Trademark Office*